March 27, 1951  T. F. SCHLICKSUPP  2,546,375
RECTILINEAR-MOTION BALL BEARING UNIT
Filed Jan. 4, 1947
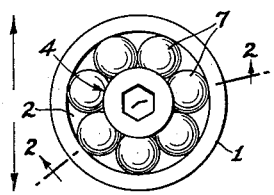
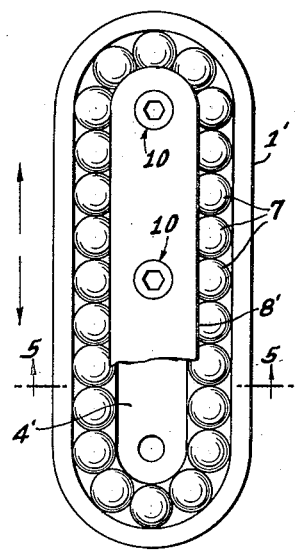
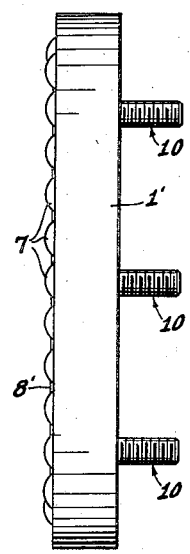
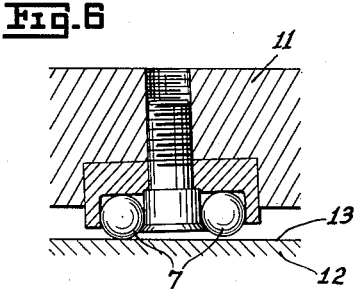
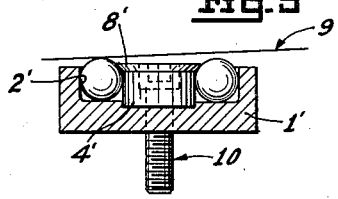
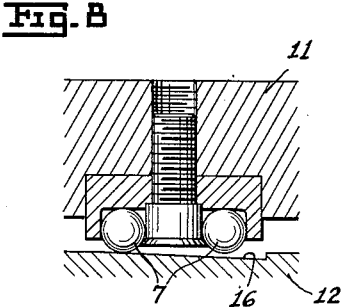
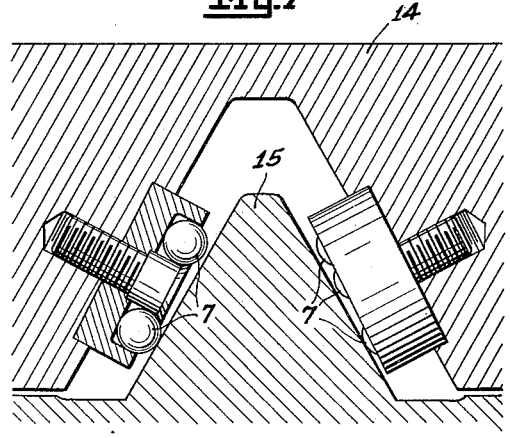
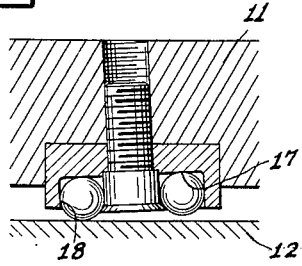
INVENTOR
Theodore F. Schlicksupp
BY
ATTORNEYS Patented Mar. 27, 1951

2,546,375

UNITED STATES PATENT OFFICE 2,546,375

RECTILINEAR-MOTION BALL-BEARING UNIT

Theodore F. Schlicksupp, Long Island City, N. Y.

Application January 4, 1947, Serial No. 720,207

3 Claims. (Cl. 308—6)

This invention relates to rectilinear-motion ball bearings and has for its principal object to provide an improved antifriction ball bearing unit adapted for use between surfaces that are relatively slidable, as for instance, a pair of generally flat surfaces at least one of which is movable in its own plane relative to the other surface.

Several forms of the improved bearing unit, all embodying the invention, are illustrated in the accompanying drawing, in which:

Figure 1 is a plan view of one form of the bearing unit as seen from the side containing the ball race;

Fig. 2 is a vertical section taken on the line 2—2 of Fig. 1;

Figs. 3–5 illustrate a modified form of the bearing unit, Fig. 3 being a plan view thereof as seen from the side containing the ball race, Fig. 4 a side elevation, and Fig. 5 a vertical transverse section taken on the line 5—5 of Fig. 3;

Figs. 6 and 7 are partial vertical sections showing the improved bearing unit mounted between two relatively slidable objects, these views being illustrative of the various uses to which the bearing unit can be put and further showing how the bearing unit may be mounted to obtain the desired circulation or progression of the antifriction balls;

Fig. 8 is a partial vertical section showing the improved bearing unit mounted between two relatively slidable objects and illustrating a modified way of obtaining the desired circulation or progression of the antifriction balls; and Fig. 9 is a partial vertical section showing a further modified form of the bearing unit mounted between two relatively slidable objects.

Referring first to Figs. 1 and 2 the bearing unit shown therein comprises a race member 1 in the form of a circular cup or button made of any suitable wear-resistant material and having in one of its faces a circular recess 2 constituting a ball pocket. The opposite face 3 of the race member 1 is preferably substantially flat as shown in Fig. 2. A shoulder bolt or screw 4 passes centrally through the race member 1. It has a threaded stem portion 5 and a larger unthreaded head portion 6. The head portion of the bolt is substantially cylindrical in shape as shown in Fig. 2 and its cylindrical wall forms with the opposing cylindrical wall of the recess 2 an annular ball race which is completely filled with a number of antifriction balls 7. The head portion 6 of the bolt is provided with a flange 8 which partly overlies the antifriction balls 7. Thus the bolt 4 serves not only as means for attaching the bearing unit to one of the objects between which it is to be used, but also as the means for retaining the antifriction balls in the ball race when the bearing unit is fastened to the object by the bolt.

If the bearing unit is attached by means of the bolt 4 to one of two objects and the surface of the other object, represented by the line 9 in Fig. 2, is relatively inclined with respect to the plane in which the centers of the antifriction balls lie, as depicted in Fig. 2, it will be seen that only a minor number of the antifriction balls at one side of the ball circuit will make contact with the surface 9. These are the load balls and all of the other balls are free to move or circulate in the ball race by reason of the fact that they are out of contact with the surface 9. Thus if the bearing unit and the surface 9 are relatively inclined in the manner shown in Fig. 2 a few of the antifriction balls at the left side of the ball circuit (in Fig. 1) will constitute the load balls, and when there is relative rectilinear movement between the object to which the bearing unit is attached and the object having the surface 9 in either of the directions indicated by the arrows in Fig. 1, the load balls will be rolled along in contact with the bottom of the recess 2 and in contact with the surface 9.

The direction in which the load balls roll will depend of course upon the direction of the rectilinear relative motion between the two objects. The rolling of the load balls will push the other free-to-circulate balls ahead of them and will thus cause the entire series of balls to progress in a circular path, the load balls moving in one direction along the load side of the ball circuit and returning in the opposite direction along the other side of the ball circuit. If one object moves relative to the other in the direction of the upper arrow shown in Fig. 1 the progression of the balls will, of course, be in a clockwise direction (in Fig. 1), and if the movement of one object relative to the other is in the direction of the lower arrow the progression of the balls will be in a counterclockwise direction.

Figs. 3–5 show a modified form of bearing unit which is similar in construction and operation to the circular bearing unit above described but it is elongated in one direction. In this case the race member 1' has the shape of an ellipse with flattened sides and is provided with a recess 2' of corresponding shape forming the ball pocket. A center member 4' having a side wall which is parallel to the inner wall of the recess 2" is secured in place by means of several shoulder bolts or screws 10 when these bolts are screwed into the object to which the bearing unit is fastened. The center member 4' forms with the recess 2' an endless channel or ball race which is completely filled with antifriction balls 7. The center member 4' has a flange 8' corresponding to the flange 8 on the bolt in Figs. 1 and 2, which partially overlies the antifriction balls and retains them in the ball race when the bearing unit is attached to an object by means of the bolts. If the bearing unit is attached to one of two objects, and the surface of the other object, represented by the line 9 in Fig. 5, is relatively inclined with respect to the plane in which the centers of the antifriction balls lie, as depicted in Fig. 5, the balls in the lefthand longitudinal run of the endless ball race (in Figs. 3 and 5) will make contact with the surface 9. Thus the balls in this run will be the load balls and the balls in the other longitudinal run of the ball race will be free to move or circulate by reason of the fact that they are out of contact with the surface 9. Thus relative rectilinear movement between the object to which the bearing unit is attached and the object having the surface 9 in either of the directions indicated by the arrows in Fig. 3 will cause the load balls to be rolled along in contact with the bottom of the recess 2' and in contact with the surface 9, thus causing progression of the entire series of balls. The load balls will roll in one direction in the lefthand run of the ball race (in Figs. 3 and 5) and will return in the opposite direction in the righthand run of the ball race.

Figs. 6 and 7 are illustrative of the various uses to which the bearing unit can be put. In Fig. 6 the bearing unit is shown attached to the under side of an upper object 11 which is rectilinearly movable relative to a lower object 12 in a direction toward and away from the reader. The bearing unit is attached to the upper object 11 by means of the attachment bolt or bolts so that the plane in which the centers of the antifriction balls lie is at a slight angle to the upper surface 13 of the lower object 12. The bearing unit shown in this figure may be either the bearing unit illustrated in Figs. 1 and 2 or the bearing unit illustrated in Figs. 3 to 5. In either case the slight tilt given to the bearing unit will establish the same angular relationship between the plane of the ball centers and the surface on which the balls roll as that shown in Figs. 2 and 5, and therefore the bearing will operate as previously described.

Fig. 7 shows how a bearing unit of the kind shown in Figs. 1 and 2 or a bearing unit of the kind shown in Figs. 3–5 can be used to mount a lathe carriage 14 on the carriage guides of the lathe, one of such guides being shown at 15. The bearing units may be mounted so that the balls have rolling contact with the sloping side walls of the guides as shown, the units being attached to the lathe carriage by the fastening bolts so that the plane of the ball centers makes a slight angle to the corresponding sloping face of the guide in order to cause the balls at one side of the ball circuit in each bearing to be the load balls and the balls at the other side of the circuit to be the freely-circulating or return balls as previously described.

It will be understood that a number of the bearing units may be arranged in a row extending in the direction in which the rectilinear relative movement between the objects takes place, all of the bearing units being similarly inclined, or some being inclined in one direction and some in the opposite direction so that the load balls of all of the bearing units in one row will not then lie on the same side of the center line of the row of bearing units but some will lie on one side and some on the other to thereby give a better load distribution.

Fig. 8 is a view corresponding to Fig. 6 but illustrates how the bearing unit may be attached to one of the objects 11 in a true fashion instead of giving it a tilt as in Fig. 6, when the surface of the other object 12 is inclined or can be given an inclination, as shown at 16. This is the condition depicted in Figs. 2 and 5, and thus the action of the balls will be the same as described in connection with those figures.

Fig. 9 shows a type of bearing unit in which the desired angular relationship between the plane of the ball centers and the surface of the object on which the balls roll is brought about, not by giving a tilt to the bearing unit when it is fastened to one of the objects or by inclining the surface of the other object on which the balls roll, but by giving an inclination to the bottom 17 of the recess 18 forming the ball pocket as shown in this figure. The bearing unit may be of the circular type shown in Figs. 1 and 2 or the elongated type shown in Figs. 3–5. When a bearing unit of the kind shown in Fig. 9 is used the surface of one object against which the bearing unit is fastened may be parallel to the surface of the other object on which the balls roll.

It will be understood that in all forms of the bearing unit the diameter of the antifriction balls is so related to the depth of the ball pocket that the load-carrying balls will project out of the ball race far enough to make rolling contact with the surface of the object on which the load balls roll.

The face of the race member opposite the face that is recessed is preferably flat, as above stated, so that it can seat against a flat surface on one of the two objects between which the bearing is to be used, and the vertical dimension of the bearing unit, i. e., the distance from such flat surface to the tops of the antifriction balls, is preferably made as small as possible so that the bearing unit can be used between surfaces that are fairly close together.

The bearing unit is simple in construction, inexpensive to manufacture, and may be handled as a unit in positioning one or more of them between the two objects in connection with which it is desired to use the bearing.

I claim:

1. A ball bearing unit adapted for use between the surfaces of two objects that are relatively slidable comprising a body portion having a recess in one of its faces forming a ball pocket, said recess extending only partially into said body portion so that balls may roll on the bottom wall of the recess, a center member separate from said body portion and positioned centrally within said recess and whose peripheral wall forms with the side and bottom walls of the recess an endless ball channel, antifriction balls completely filling said channel, said center member having a radially extending flange adapted to partly overlie the balls in said channel, and at least one screw-threaded member passing through said body portion and adapted when screwed into one of the two objects between which the bearing unit is to be positioned to clamp said center member against the bottom of the recess in the body portion and at the same time clamp the unrecessed face of the body portion against such object, the balls then being retained in said channel by said radially extending flange on the center member which partly overlies them, and the balls being of such size as to project out of at least one portion of said channel when the bearing unit is thus attached to one of the objects so that they can make rolling contact with the surface of the other object.

2. A ball bearing unit adapted for use between the surfaces of two objects that are relatively slidable comprising a circular race member having a recess in one of its faces forming a ball pocket, said recess extending only partially into said race member so that balls may roll on the bottom wall of the recess, a bolt passing centrally through said race member and having a cylindrical head portion the side wall of which forms with the side and bottom walls of said recess an endless ball channel, antifriction balls completely filling said channel, the head portion of the bolt having a radially extending flange adapted to partly overlie the antifriction balls, the bolt having a threaded stem portion passing through the race member and adapted when screwed into one of the two objects between which the bearing unit is to be positioned to clamp the head of the bolt against the bottom of the recess in the race member and at the same time clamp the unrecessed face of the race member against such object, the balls then being retained in said channel by said radially extending flange on the head of the bolt which partly overlies them, and the balls being of such size as to project out of at least a portion of said channel when the bearing unit is thus attached to one of the objects so that they can make rolling contact with the surface of the other object.

3. A ball bearing unit adapted for use between the surfaces of two objects that are relatively slidable comprising an elongated body portion having an elongated recess in one of its faces forming a ball pocket, said recess extending only partially into said body portion so that balls may roll on the bottom wall of the recess, an elongated center member separate from said body portion and positioned centrally within said recess and whose peripheral wall forms with the side and bottom walls of the recess an endless ball channel shaped like an ellipse with flattened sides, antifriction balls completely filling said channel, said center member having a radially extending flange adapted to partly overlie the balls in said channel, and a series of bolts passing through said center member adapted to be screwed into one of the two objects between which the bearing unit is to be positioned to clamp said center member in position against the bottom of the recess in the body portion and at the same time clamp the unrecessed face of the body portion against such object, the balls then being retained in said channel by said radially extending flange on the center member which partly overlies them, and the balls being of such size as to project out of at least one run of said channel when the bearing unit is thus attached to one of the objects so that they can make rolling contact with the surface of the other object.

THEODORE F. SCHLICKSUPP.

REFERENCES CITED

The following references are of record in the file of this patent:

UNITED STATES PATENTS

| Number | Name | Date |
|---|---|---|
| 615,529 | Cobb | Dec. 6, 1898 |
| 640,397 | Merker | Jan. 2, 1900 |
| 696,388 | Bosworth | Mar. 25, 1902 |
| 1,918,108 | Jonkhoff | July 11, 1933 |

FOREIGN PATENTS

| Number | Country | Date |
|---|---|---|
| 23,704 | Great Britain | 1904 |
| 755,957 | France | 1933 |
| 429,976 | Great Britain | 1935 |